UNITED STATES PATENT OFFICE.

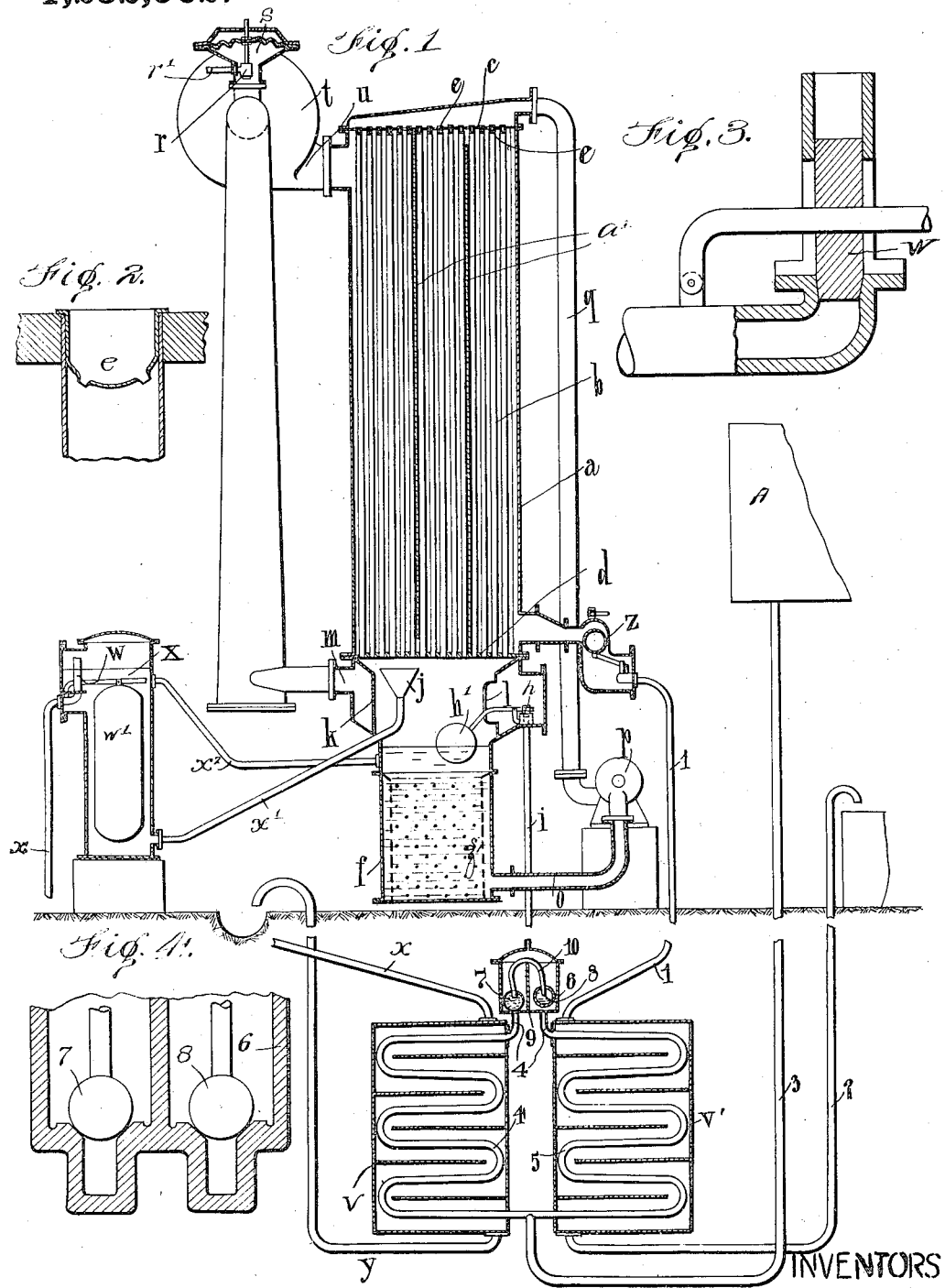

OLOF SÖDERLUND AND TEOFRON BOBERG, OF CLAPHAM PARK, LONDON, ENGLAND, ASSIGNORS TO TECHNO CHEMICAL LABORATORIES LIMITED, OF LONDON, ENGLAND.

DISTILLATION OF LIQUIDS.

1,252,962.   Specification of Letters Patent.   Patented Jan. 8, 1918.

Application filed December 10, 1914. Serial No. 876,567.

*To all whom it may concern:*

Be it known that we, OLOF SÖDERLUND and TEOFRON BOBERG, both subjects of the King of Sweden, and both residing at Fairlawn, Clarence Road, Clapham Park, in the county of London, England, have invented certain new and useful Improvements Relating to the Distillation of Liquids, of which the following is a specification.

This invention relates to the evaporation and condensation of fluids, and particularly to the distillation of a dilute and easily obtainable solution such as sea-water for obtaining a pure liquid therefrom.

The object of the invention is to simplify and increase the heat economy of such processes.

It is already well known when evaporating a liquid by means of the heat of the compressed vapor arising therefrom to recuperate the waste heat of both the concentrate and the condensate which is utilized to heat the feed on its way to the evaporator, and thermostatic devices for controlling the flow of the feed under such circumstances have been proposed.

In any apparatus for evaporating a solution the desirability of preventing concentration which would lead to depositing of the substance held in solution is recognized, but this feature assumes an increasing importance in apparatus operating with compressed vapor as above indicated and wherein economy largely turns upon the maintenance of a very slight temperature difference between the heat imparting and heat receiving mediums. In such apparatus, distribution of the liquid as a film over the heating surface has already been proved the most satisfactory method of operation and under such conditions it is apparent that any depositing of scale upon the heating surface will greatly impair the efficiency of the apparatus.

When as is frequently the case, the boiling point of a solution increases with its concentration, it is desirable in apparatus maintaining only a slight temperature difference to restrict the degree of concentration in a given apparatus to the smallest limits from the point of view of economy, as already indicated. From the foregoing, therefore, it is apparent that the less the degree of concentration adopted, the greater are the advantages to be derived in apparatus of the foregoing type provided suitable means are introduced for recovering the heat which would otherwise be carried off in the large quantity of slightly concentrated solution.

The invention consists in an evaporation system in which a solution is concentrated to a moderate degree and the evaporated liquid recovered by condensation, automatic means being provided for applying an equal degree of thermal regeneration to both the concentrate and the condensate of the process.

The invention further consists in the improvements in distillation systems as hereinafter described and claimed.

Apparatus for carrying out the invention is shown in one form on the accompanying drawing, in which:—

Figure 1 is a diagrammatic section of the complete apparatus;

Fig. 2 is a detail thereof;

Fig. 3 is an enlarged detail sectional view of the float controlled valve W; and Fig. 4 is an enlarged detail sectional view of the control chamber.

Referring to the drawing, $a$ is a shell provided with baffles $a'$ and containing tubes $b$ held in tube plates $c$ and $d$ at the top and bottom of the shell. The upper ends of the tubes $b$ are provided with distributing nozzles $e$, see Fig. 2, which evenly distribute the liquid as a thin film over the interior surface of the tube. To the lower portion of the shell $a$ is secured an extension $f$ containing a cylindrical strainer $g$ formed by a surrounding curtain or screen provided with a plurality of holes. The upper end of the extension is enlarged and provided with an annular partition $k$ having an outlet $l$. The feed pipe $i$ provided with a valve $h$ controlled by the ball float $h'$ discharges into the space between the partition $k$ and the wall of the extension, and from said space the vapor main $m$ is led up to the tap of the apparatus. The vapor main $m$ is connected with a rotary compressor $t$ which draws vapor from the extension and delivers it after compression through pipe $u$ to the steam space around the tubes $b$ in the shell $a$. The vapor main $m$ is provided with a live steam valve $r$ actuated by a flexible diaphragm $s$ connected to the valve spindle and subjected on one side to the pressure existing in the main. This valve is for supplying additional steam from an outside source for heating up the apparatus and also, if required, in order to maintain constant pressure conditions in the apparatus. The valve is opened by a fall of pressure in the main. A circulating pump $p$ is connected with extension $f$ by a pipe $o$ and by a pipe $q$ with the space in the shell above the tube-plate $c$. Within the extension $f$ is a collecting funnel $j$ placed so as to collect a portion of the unvaporized feed and convey it to the chamber X by pipe $x'$. As the density of the liquid collected increases during the evaporation process, the lighter liquid is displaced from the top of the chamber X through pipe $x^2$, back into the extension $f$. A valve W controlled by a float W' is opened when a given predetermined density is reached, thus permitting discharge of the concentrate through the pipe $x$.

The heat regenerating elements comprise two separate recuperators $v$ and $v'$. The recuperator $v$ is connected with the evaporator by the pipe $x$ and specific gravity controlled valve $w$ hereinbefore described, and it is provided with the discharge pipe $y$. The recuperator $v'$ is connected by a pipe 1 with the steam trap $z$ and is provided with a discharge pipe 2, the trap $z$ being connected with the vapor space of the shell.

The feed supply pipe 3 leads from a tank A and is provided with coiled branches 4 and 5 arranged in the recuperators $v$ and $v'$ respectively. The upper ends of the branches 4 and 5 extend out through the recuperators into a control chamber 6 arranged above the recuperators and from which the pipe $i$ leads. The control chamber is provided with a partition 9 and within the said chamber is a float controlling device, consisting of two bulbs connected by a bent tube 10 and arranged on opposite sides of the said partition, and adapted to alternately close and open the pipes 4 and 5. The bulbs contain a volatile liquid such as ethylene chlorid or any other suitable heavy volatile liquid.

In operation, the steam to heat up the apparatus is supplied by the pipe $r'$ and valve $r$ which may be temporarily operated irrespective of the pressure acting on the diaphragm $s$. The compressor then draws off the vapor from the evaporation side of the tubes and delivers it compressed to the heating side. The liquid to be distilled passes from the feed tank A through the pipe 3 and after division into two streams, through the pipes 4 and 5 in the recuperators into the chamber 6 and thence through pipe $i$ into the extension $f$. It is then caused to circulate through the apparatus by means of the pipe $o$, pump $p$, pipe $q$ and tubes $b$, the vapors therefrom being continually forced by the compressor $t$ into the shell in order to supply by compression of the vapors the heat necessary to maintain the evaporating action. A part of the concentrate passes by way of funnel $j$ and pipe $x'$ to the chamber X from which, when the required density is reached, concentrate is discharged by pipe $x$ to the recuperator $v$ and thence by pipe $y$ to a suitable drain. The condensate passes from the shell $a$ to the recuperator $v'$ by way of trap $z$, and pipe 1 and finally leaves the apparatus by the pipe 2. Now when both portions of the feed are at the same temperature, the bulb controlling device floats level in the chamber 6 and both branch pipes 4 and 5 deliver into the said chamber 6, but if any difference in temperature arises, the liquid is displaced from one bulb to the other, say, for example, by the distillation of the volatile liquid from the hotter bulb to the colder one, and the said device tilts, partly obstructing the entrance of the liquid on the colder side and thereby causing a greater proportion of the feed to pass through the hotter side. This continues until the feed is again at the same temperature in each of the coils 4 and 5, then the bulb device returns to normal level position and the feed passes through both pipes 4 and 5.

Having now described our invention, what we claim as new and desire to secure by Letters Patent is:—

1. In the evaporation of a solution to concentrate it to a moderate degree and recover by condensation the liquid driven off as vapor, dividing the solution passing to the evaporator into two streams bearing such proportions to one another that by recuperating the heat of the concentrate by means of one stream and the heat of the condensate by means of the other stream a maximum thermal regeneration is obtained.

2. In the evaporation of a solution to concentrate it to a moderate degree and recover by condensation the liquid driven off as vapor, dividing the solution passing to the evaporator into two streams, passing one of said streams through a heat recuperating device heated by the concentrate, passing the other through a like device heated by the condensate and controlling the relative proportions of said streams by means adapted to increase the volume of one stream and diminish the volume of the other in the event of the temperature of the former rising above that of the latter.

3. In the evaporation of a solution to concentrate it to a moderate degree and recover by condensation the liquid driven off as vapor, dividing the solution passing to the evaporator into two streams, passing one of said streams through a heat recuperating device heated by the concentrate, passing the other through a like device heated by the condensate and controlling the relative proportions of said streams by a valve device comprising two hollow bulbs containing liquid and connected by a tube, each bulb being adapted by reason of the weight of its contained liquid to control the volume of one of said streams and an increase of temperature in one bulb being adapted to displace liquid therefrom to the other bulb, whereby the relative volumes of the two streams are altered until their temperatures are again equalized.

4. In the evaporation of liquids to concentrate a solution to a moderate degree and recover by condensation the liquid driven off as vapor, recuperating the heat of the distillate and of the residual concentrate in separate portions of cooler liquid about to be subjected to evaporation and apportioning the relative amounts of cooler liquid by differential control influenced by the relative temperatures of the distillate and the concentrate.

5. In apparatus for evaporating a solution to concentrate it to a moderate degree and recover by condensation the liquid driven off as vapor, a heat recovery device for extracting the heat of the concentrate, a like device for dealing with the condensate and a valve operated by a liquid which is displaced as the result of its temperature for controlling the flow of the solution to be evaporated through said heat recovery devices.

6. In apparatus for evaporating a solution to concentrate it to a moderate degree and recover by condensation the liquid driven off as vapor, a device for recovering the heat of the concentrate in solution to be evaporated, a device for recovering the heat of the condensate in solution to be evaporated and a valve operated by a liquid which is displaced as the result of its temperature for dividing the total volume of solution to be evaporated between said two heat recovery devices in accordance with the amounts of heat available in each.

7. In apparatus for evaporating a solution to concentrate it to a moderate degree and recover by condensation the liquid driven off as vapor, a heat recovery device for extracting the heat of the concentrate, a like device for dealing with the condensate, a hollow bulb weighted with a volatile liquid for controlling the flow of solution to be evaporated through the former heat recovery device, a like bulb for performing a similar function in said latter device and a tube connecting said two bulbs so that volatile liquid is displaced from the hotter to the cooler, whereby the heat of both the condensate and concentrate is extracted to an equal amount.

In testimony whereof we have signed our names to this specification in the presence of two subscribing witnesses.

OLOF SÖDERLUND.
TEOFRON BOBERG.

Witnesses:
  BERTRAM H. MATTHEWS,
  WILLIAM H. BIRD.